United States Patent [19]

Hsieh

[11] Patent Number: 5,257,518
[45] Date of Patent: Nov. 2, 1993

[54] LOCKING DEVICE FOR LOCKING A STEERING WHEEL OF A CAR

[76] Inventor: Chung-Fang Hsieh, 3F, No. 86, Kuang-Ming Rd., Pei-Tou Dist., Taipei, Taiwan

[21] Appl. No.: 29,563

[22] Filed: Mar. 11, 1993

[51] Int. Cl.⁵ .............................................. B60R 25/02
[52] U.S. Cl. ...................................... 70/209; 70/226; 70/238
[58] Field of Search .................... 70/209–212, 70/225, 226, 237, 238

[56] References Cited

U.S. PATENT DOCUMENTS

| | | | |
|---|---|---|---|
| 4,747,279 | 5/1988 | Solow | 70/238 |
| 4,825,671 | 5/1989 | Wu | 70/238 |
| 4,848,110 | 7/1989 | Kuo | 70/238 X |
| 4,974,433 | 12/1990 | Wang | 70/238 X |
| 5,033,281 | 7/1991 | Kofman et al. | 70/209 X |
| 5,052,201 | 10/1991 | Liou | 70/226 X |
| 5,097,685 | 3/1992 | Lien | 70/209 |
| 5,121,617 | 6/1992 | Chen | 70/209 |
| 5,131,245 | 7/1992 | Chen | 70/209 |
| 5,199,284 | 4/1993 | Lin | 70/209 |

FOREIGN PATENT DOCUMENTS

| | | | |
|---|---|---|---|
| 925217 | 8/1947 | France | 70/238 |
| 2639591 | 6/1990 | France | 70/226 |

Primary Examiner—Peter M. Cuomo
Assistant Examiner—Suzanne L. Dino
Attorney, Agent, or Firm—Sandler, Greenblum & Bernstein

[57] ABSTRACT

A locking device includes a first lock body which has a front end with a first clamp member projecting frontwardly, a rear end opposite to the front end and a blind bore extending longitudinally from the front to the rear end. An elongated rod with a plurality of annular grooves formed along the length is retractably received in the blind bore. A second lock body has a front end with a second clamp member projecting frontwardly and a rear end opposite to the front end. The rear end of the second lock body is pivoted to the rear end of the first lock body between a first position where the second clamp is distal from the first clamp and a second position where the second clamp cooperates with the first clamp to define an enclosed clamp. A key-operated cylinder lock including a plug member therein retains the elongated rod at a predetermined position and disengages the second lock body from the first lock body at the second position. A rotation of the plug member in the cylinder lock permits the disengagement of the elongated rod from the predetermined position in the blind bore and disengagement of the second lock body from the first lock body.

5 Claims, 4 Drawing Sheets

LOCKING DEVICE FOR LOCKING A STEERING WHEEL OF A CAR

BACKGROUND OF THE INVENTION

1. Field of the Invention

The invention relates to a locking device, more particularly to one which is used for locking a steering wheel of a car so that the car can not be driven away even if an intruder can break open the door and gets into the car.

2. Description of the Related Art

Referring to FIGS. 1 and 2, a conventional locking device for locking a steering wheel of a car is shown to comprise an elongated lock casing (11) having a blind bore (not number) extending longitudinally along the axis thereof. The elongated lock casing (11) has a first hook portion (14) formed thereon to hook with a first section of the steering wheel (17). An elongated rod (12), which has a plurality of annular grooves (121) formed thereon along a longitudinal axis, is inserted into the blind bore of the elongated lock casing (11). A free end of the elongated rod (12) with a second hook portion (15) extends out of the blind bore to hook with a second section of the steering wheel (17). Since a locking means (13) including a locking bolt is provided in the elongated locking casing (11), the locking bolt extends into one of the annular grooves (121) thus locking the steering wheel as illustrated in FIG. 2.

A drawback of the above-mentioned locking device is that the first hooking portion (14) welded on the elongated lock casing (11) can be easily broken by a long pipe (18) sleeved thereon and when turned as shown in FIG. 2.

SUMMARY OF THE INVENTION

Therefore, a main object of the present invention is to provide a locking device for locking a steering wheel of a car, which locking device includes an enclosed clamp member such that the enclosed clamp member can not be easily broken.

According to the present invention, the locking device includes a first lock body with a front end having a first clamp member projecting therefrom, a rear end opposite to the front end and a blind bore formed adjacent to the first clamp member and extending longitudinally from the front to the rear end, and an elongated rod extends into the blind bore and has a plurality of annular grooves formed along the length. The elongated rod has a free end with a first hook portion extending out of the blind bore to hook with a first section of the steering wheel. A second lock body has a front end with a second clamp member projecting therefrom and a rear end opposite to the front end which is pivoted to the rear end of the first lock body between a first position, where said second clamp member is distal from the first clamp member, and a second position, where the second clamp member cooperates with the first clamp member to define an enclosed clamp portion to clamp a second section of the steering wheel away from the first section. The locking device also includes a key-operated cylinder lock with a lock casing and a plug member rotatably provided in the lock casing, a first spring-loaded locking bolt and a second spring-loaded locking bolt. The plug member has an actuating end extending through and engaging the first and second locking bolts. The first locking bolt passes through the lock casing and extends into one of the annular grooves in the elongated rod in the blind bore to retain the elongated rod at a predetermined position. The second locking bolt passes through the lock casing and extends into the second lock body to retain the second lock body at the second position. A rotation of the plug member relative to the first lock body causes the first and second locking bolts to retract into the lock casing.

BRIEF DESCRIPTION OF THE DRAWINGS

Other features and advantages of the present invention will become apparent in the following detailed description, including drawings, all of which show a non-limiting form of the invention, and in which.

DETAILED DESCRIPTION OF THE PREFERRED EMBODIMENTS

Figure 1:
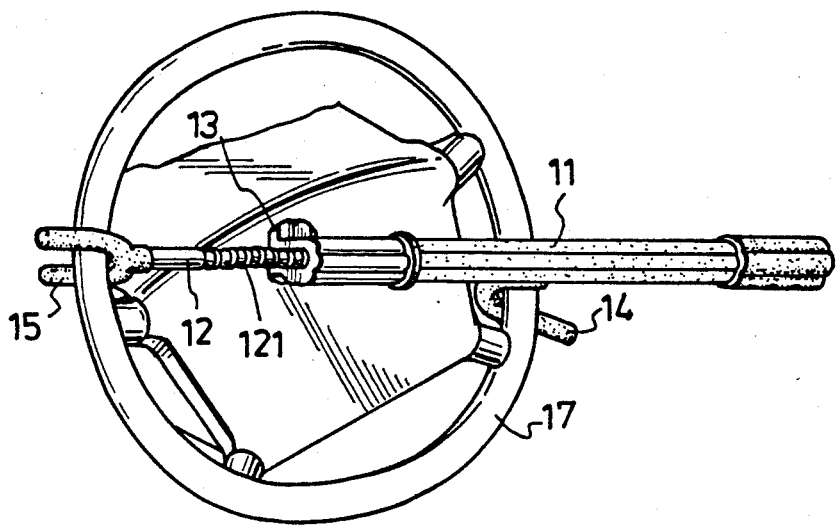
FIG. 1 shows a locking device of the prior art locking a steering wheel of a car.
Figure 2:
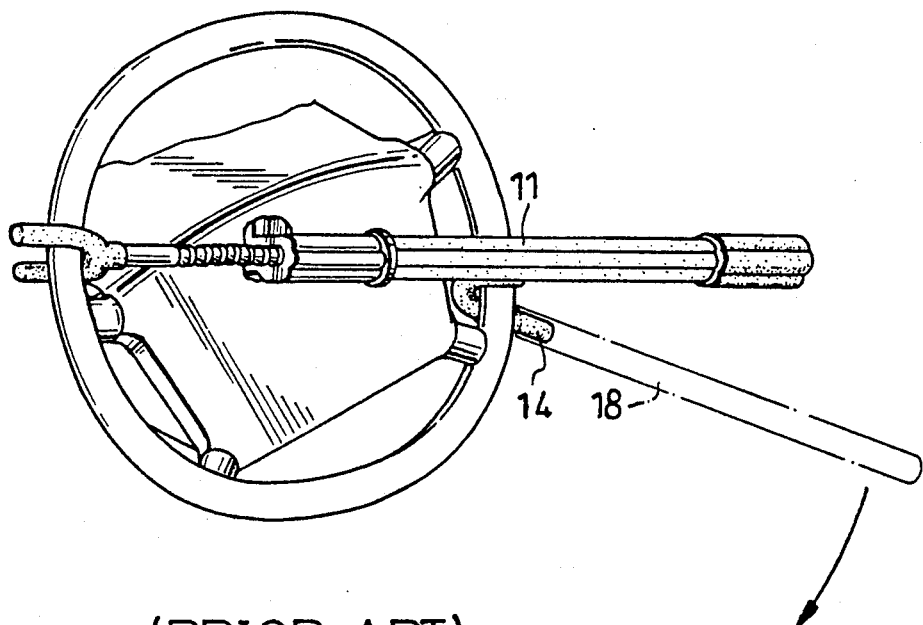
FIG. 2 shows the locking device of the prior art illustrated as being broken.
Figure 3:
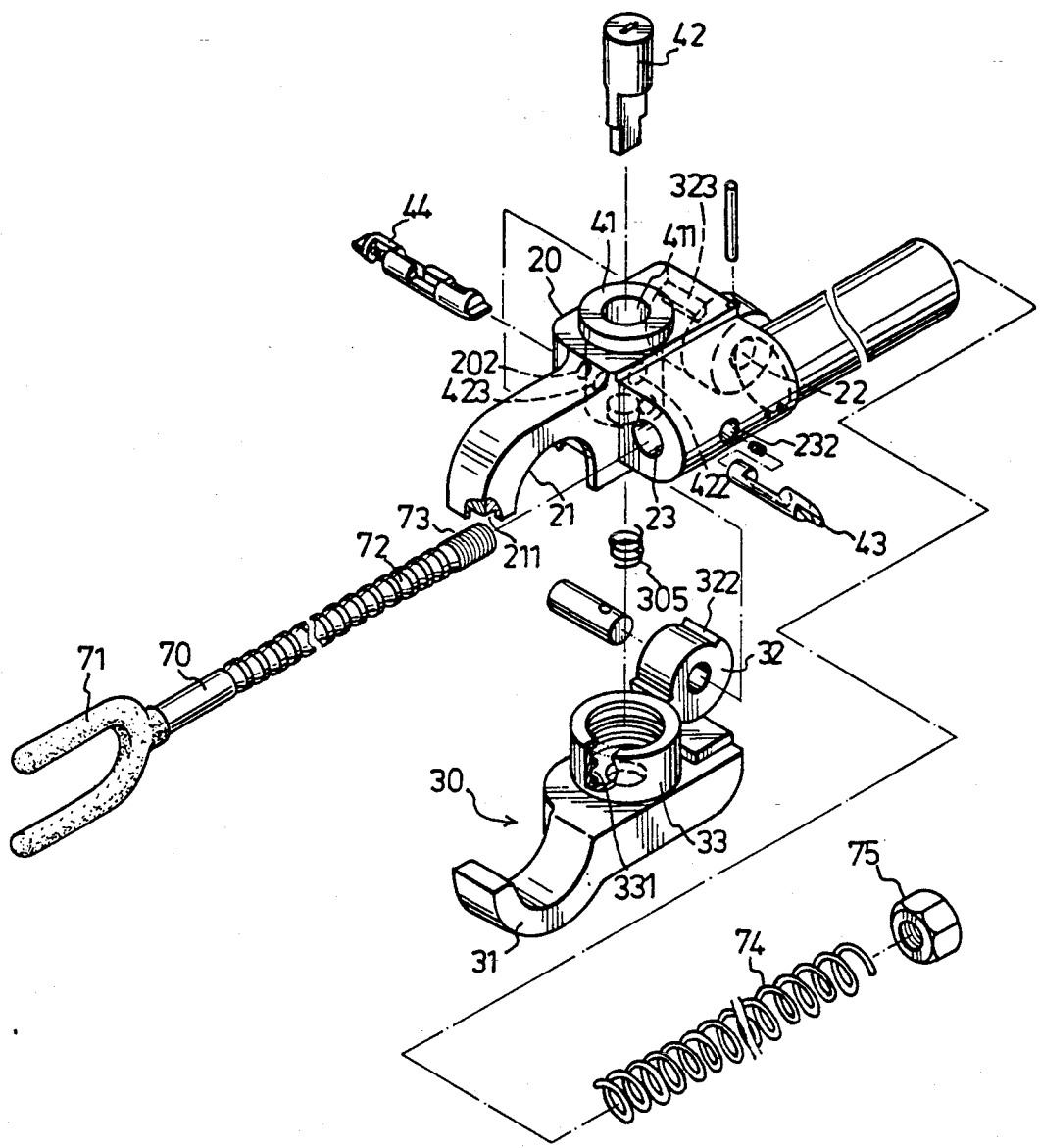
FIG. 3 shows an exploded view of a locking device according to the present invention for locking a steering wheel of a car.
Figure 5:
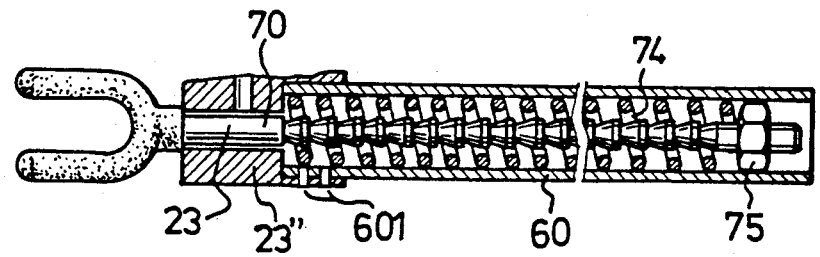
FIG. 5 shows a cross sectional view of a part of the locking device of the present invention.

Referring to FIGS. 3 and 5, a locking device (1) according to the present invention for locking a steering wheel of a car is shown to comprise a first body (20), a second lock body (30), a blind bore (60), an elongated rod (70) retractably provided in the blind bore (60) and a key-operated cylinder lock.

Figure 4:
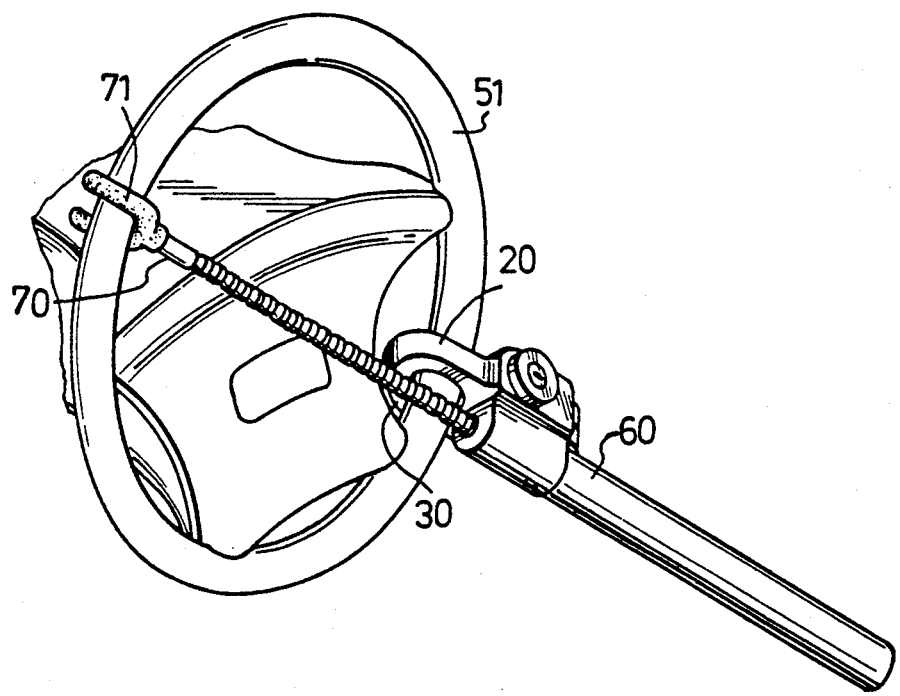
FIG. 4 shows the locking device of the present invention illustrated locking a steering wheel of a car.
Figure 6:
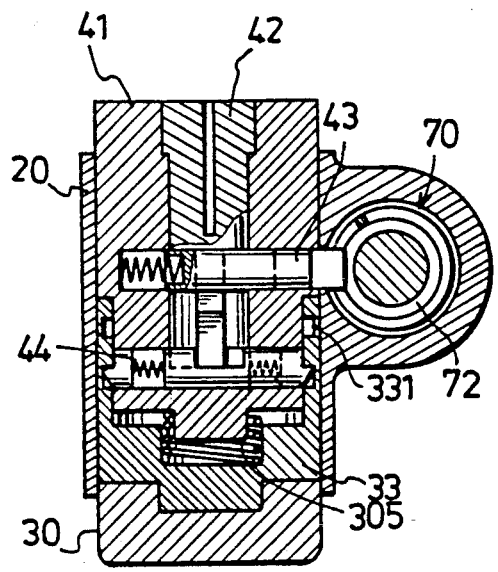
FIG. 6 is a cross sectional view of the locking device of the present invention shown at a locking configuration.
Figure 7:
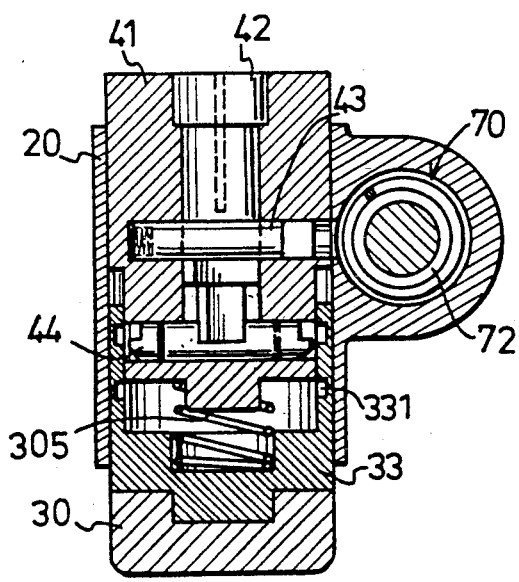
FIG. 7 is a cross sectional view of the locking device of the present invention shown at an unlocking configuration.

The first lock body (20) is a substantially rectangular block having a top end, a bottom end, a front end with a first clamp member (21) projecting therefrom, a rear end opposite to the front end and a blind bore (23) formed adjacent to the first clamp member (21) and extending longitudinally from the front end toward the second end. The blind bore (23) has a pair of aligned first holes (232) diametrically disposed therein. An elongated rod (70) which has a first threaded end (73), a second hooked end (71) opposite the first threaded end and a plurality of annular grooves (72) formed thereon along a longitudinal axis thereof, is inserted into the blind bore (23) such that the second hooked end (71) extends out of the blind bore (23) to hook with a first section of the steering wheel as shown in FIG. 4. The first lock body further includes a stop member (23") located at the front end and extending into the blind bore (23). The stop member (23") has a central opening which permits the elongated rod (70) to pass through when the latter is inserted into the blind bore (23). A nut (75) is threaded on the first threaded end (73) of the elongated rod (70). A coil spring (74) is provided around the elongated rod (70), which has a first end abutting against the nut (75) and a second end abutting against the stop member (23"). Thus, the elongated rod (70) is retractably retained in the blind bore (23).

The first lock body (20) also has a through bore (not numbered) extending from the top end toward the bottom end transverse to the blind bore (23). A cylindrical casing (41) is provided in an upper portion of the through bore and has a axial blind hole (411) to receive rotatably a plug member (42) therein. The cylindrical casing (41) has a second hole (422) radially extending and in communication with the pair of aligned first holes (232) of the blind bore (23) and a pair of aligned third holes (423) below the second hole (422) radially and diametrically passing through and extending out of the cylindrical casing (41). The first lock body (20) has an additional hole located on one side, aligned and in communication with the pair of third holes (423). A first spring-loaded locking bolt (43) is inserted through the first hole (232) and to be inside the second hole (422) of the cylindrical casing (41) such that a free end of the first locking bolt (43) extends into one of the annular grooves (72) of the elongated rod (70) to retain the elongated rod (70) at a predetermined position. A second spring-loaded locking bolt (44) is inserted through the additional side hole and is in the third hole (423) of the cylindrical casing (41) such that two free ends of the second locking bolt (44) extend out of the cylindrical casing (41). Since the plug member (42) rotatably received in the cylindrical casing (41) has an actuating end passing through and engaging with the first and second locking bolts (43,44), a rotation of the plug member (42) relative to the first lock body (20) causes the free ends of the first and second spring-loaded locking bolts to retract into the casing (41).

The second lock body (30) is a substantially rectangular plate with a tubular member (33) formed thereon (202), a front end with a second clamp member (31) and a rear end opposite to the front end. The tubular member (33) has a first annular groove (331) formed on an inner wall thereof. The rear end of the second lock body (30) has a round protrusion (32) by which the second lock body can be pivoted to the first lock body (20) between a first position wherein the second clamp member (31) is distal from the first clamp member (21) and a second position wherein said second clamp member (31) cooperates with the first clamp member (21) of the first lock body (20) to define an enclosed clamp member for clamping a second section of the steering wheel (51). In this situation a lower portion of the cylindrical casing (41) extends into the tubular member (33) wherein two free ends of the second locking bolt (44) extend into the first annular groove (331) of the tubular member (44) to retain the second lock body, thus preventing the second lock body (30) from disengaging from the first lock body (20).

In order to permit easy disengagement of the second lock body (30) from the first lock body (20), a spring means (305) can be disposed at a bottom of the cylindrical casing (41) to bias the second lock body at the second position. Thus, when the plug member (42) is rotated relative to the first lock body (20) by an inserted key, the free ends of the first and second locking bolts (43,44) retract into the cylindrical casing (41), permitting disengagement of the elongated rod (70) from the predetermined position, and the second lock body (30) correspondingly moves to the second position.

The round protrusion (32) at the rear end of the second lock body (30) is provided with an abutting edge (322) which abuts against another abutting edge (323) of the first lock body (20) so that the second lock body (20) is at a prearranged angle relative to the first lock body at the second position.

The tubular member (33) of the second lock body (30) is provided with a second annular groove (331) and the spring-loaded second locking bolt (44) can be made to extend into the second annular groove as in the same manner. Once thus provided, the enclosed clamp member can lock a steering wheel of a considerable thickness in cross section.

A free end of the first clamp member (21) is provided with a recess (211) to receive a free end of the second clamp member (31) wherein the periphery of the free end of the second clamp member (31) properly fits in the recess so as to confine the enclosed clamp member, thus providing an additional engagement when the second clamp member is at the second position.

One can easily understand from the above explanation that the first and second clamp members cooperatively define an enclosed clamp and that the enclosed clamp is securely locked by the key-operated cylinder lock. Thus, the locking device of the present invention can not be easily broken as happened in the prior art model. The locking device of the present invention is correspondingly stronger and firmer when compared to the prior art model.

While a preferred embodiment have been described and illustrated, it will be apparent that many changes and modifications can be made in the general and construction and arrangement of the present invention without departing from the scope and spirit thereof. Therefore, it is desired that the present invention be not limited to the exact disclosure but only to the extent of the appended claims.

I claim:

1. A locking device for locking a steering wheel of a car, comprising:

a first lock body having a front end with a first clamp member projecting therefrom, a rear end opposite to said front end and a blind bore formed adjacent to said first clamp member and longitudinally extending from said front end to said rear end;

an elongated rod extending into said blind bore and having a plurality of annular grooves formed thereon along a longitudinal axis thereof, said elongated rod further having a free end with a hook portion extending out of said blind bore to hook with a first section of said steering wheel;

a second lock body having a front end with a second clamp member projecting therefrom and a rear end opposite to said front end, said rear end of said second lock body being pivoted to said rear end of said first lock body between a first position, wherein said second clamp member is distal from said first clamp member, and a second position, wherein said second clamp member cooperates with said first clamp member to define an enclosed clamping portion for clamping a second section of said steering wheel spaced from said first section; and a key-operated cylinder lock including a lock casing and a plug member rotatably provided in said lock casing, a first spring-loaded locking bolt and a second spring-loaded locking bolt respectively provided in said lock casing, said plug member having an actuating end extending through and engaging said first and second locking bolts, said first locking bolt passing through said lock casing and extending into one of said annular grooves in said elongated rod in said blind bore to retain said elongated rod at a predetermined position, and said second locking bolt passing through said lock casing and extending into said second lock body to retain said second lock body at said second position, rotation of said plug member relative to said first lock body causing said first and second locking bolts to retract into said lock casing;

whereby when said plug member is rotated, said first and second locking bolts retract into said lock casing to permit disengagement of said elongated rod from said predetermined position and said second lock body to move correspondingly to said second position.

2. A locking device as claimed in claim 1, wherein said first lock body is a substantially rectangular block with a top end, a bottom end and a through bore extending from said top end to said bottom end transverse to said blind bore, said lock casing provided in an upper portion of said through bore and having an axial blind hole to receive said plug member therein, said lock casing further having a first hole radially extending therethrough and a pair of aligned second holes diametrically extending therethrough below said first hole, said spring-loaded first locking bolt extending into said first hole, said spring-loaded second locking bolt extending into said aligned second holes, said second lock body being a substantially rectangular plate and having a tubular member formed thereon with a central hole therein to received a lower portion of said lock casing, and said tubular member further having a first annular groove formed on an inner wall thereof into which two free ends of said second locking bolt extend.

3. A locking device as claimed in claim 1, further comprising spring means attached to a bottom end of said lock casing to bias said rectangular plate so as to push said tubular member from said lock casing when said plug member is rotated to retract said first and second locking bolts into said lock casing.

4. A locking device as claimed in claim 1, further comprises compression spring means provided in said blind bore to retain retractably said elongated rod therein.

5. A locking device as claimed in claim 2, wherein said tubular member is further provided with a second annular groove formed on said inner wall adjacent to said first annular groove.

* * * * *